US011089908B2

(12) United States Patent
 Van Hoek et al.

(10) Patent No.: US 11,089,908 B2
(45) Date of Patent: Aug. 17, 2021

(54) APPARATUS AND METHOD FOR OBTAINING PERSONALIZED BLENDS OF COFFEE

(71) Applicant: Illycaffè S.p.A. Con Unico Socio, Trieste (IT)

(72) Inventors: Elias Van Hoek, Trieste (IT); Henk Van Der Wulp, Trieste (IT); Marcel Weijers, Trieste (IT); Ma Voogsgerd, Trieste (IT); Riccardo Piras, Monza (IT)

(73) Assignee: ILLYCAFFÈ S.P.A. CON UNICO SOCIO, Trieste (IT)

( * ) Notice: Subject to any disclaimer, the term of this patent is extended or adjusted under 35 U.S.C. 154(b) by 170 days.

(21) Appl. No.: 16/337,068

(22) PCT Filed: Sep. 27, 2017

(86) PCT No.: PCT/EP2017/074564
§ 371 (c)(1),
(2) Date: Mar. 27, 2019

(87) PCT Pub. No.: WO2018/060295
PCT Pub. Date: Apr. 5, 2018

(65) Prior Publication Data
US 2020/0029739 A1    Jan. 30, 2020

(30) Foreign Application Priority Data

Sep. 27, 2016  (IT) .......................... 102016000096953

(51) Int. Cl.
*G01G 19/22* (2006.01)
*G07F 13/02* (2006.01)
*A47J 42/50* (2006.01)

(52) U.S. Cl.
CPC .............. *A47J 42/50* (2013.01); *G01G 19/22* (2013.01); *G07F 13/025* (2013.01)

(58) Field of Classification Search
CPC ............................ G01G 19/22; G07F 13/025
(Continued)

(56) References Cited

U.S. PATENT DOCUMENTS 4,789,106 A * 12/1988 Weber .................... A47J 31/42
                                                      241/100
5,603,458 A *  2/1997 Sandolo ................... A47F 1/02
                                                      241/100
(Continued)

FOREIGN PATENT DOCUMENTS

JP      H1166419 A       3/1999
KR      101468359     * 12/2014
(Continued)

OTHER PUBLICATIONS

Int'l Search Report and Written Opinion dated Dec. 4, 2017 in Int'l Application No. PCT/EP2017/074564.

*Primary Examiner* — Jacques M Saint Surin
(74) *Attorney, Agent, or Firm* — Panitch Schwarze Belisario & Nadel LLP

(57) ABSTRACT

An apparatus for obtaining personalized coffee blends includes a plurality of supply units each configured to supply a specific type of coffee bean to a collection container and each provided with at least a containing device in which the coffee beans of the specific type of coffee are contained. Each supply unit includes a first volumetric feed device and a second volumetric feed device.

21 Claims, 6 Drawing Sheets

(58) Field of Classification Search
USPC .......................................................... 177/200
See application file for complete search history.

(56) References Cited

U.S. PATENT DOCUMENTS

| | | | | |
|---|---|---|---|---|
| 5,878,654 | A * | 3/1999 | Kobayashi | A47J 31/34 |
| | | | | 426/433 |
| 6,823,770 | B2 * | 11/2004 | Steckhan | A47J 42/50 |
| | | | | 99/286 |
| 7,051,646 | B2 * | 5/2006 | Della Pietra | A47J 31/3633 |
| | | | | 99/280 |
| 7,243,867 | B2 * | 7/2007 | Steckhan | A47J 31/42 |
| | | | | 241/100 |
| 8,096,229 | B2 * | 1/2012 | Keller | A47J 31/42 |
| | | | | 99/286 |
| 9,265,377 | B2 * | 2/2016 | de Graaff | A23F 5/262 |
| 9,339,141 | B2 * | 5/2016 | Van Os | A47J 31/404 |
| 2012/0024160 | A1 | 2/2012 | Van Os et al. | |
| 2019/0357720 | A1 * | 11/2019 | Abbiati | A47J 42/38 |

FOREIGN PATENT DOCUMENTS

| | | |
|---|---|---|
| WO | 0148711 A1 | 7/2001 |
| WO | 2013160825 A2 | 10/2013 |
| WO | 2016113258 A1 | 7/2016 |

* cited by examiner

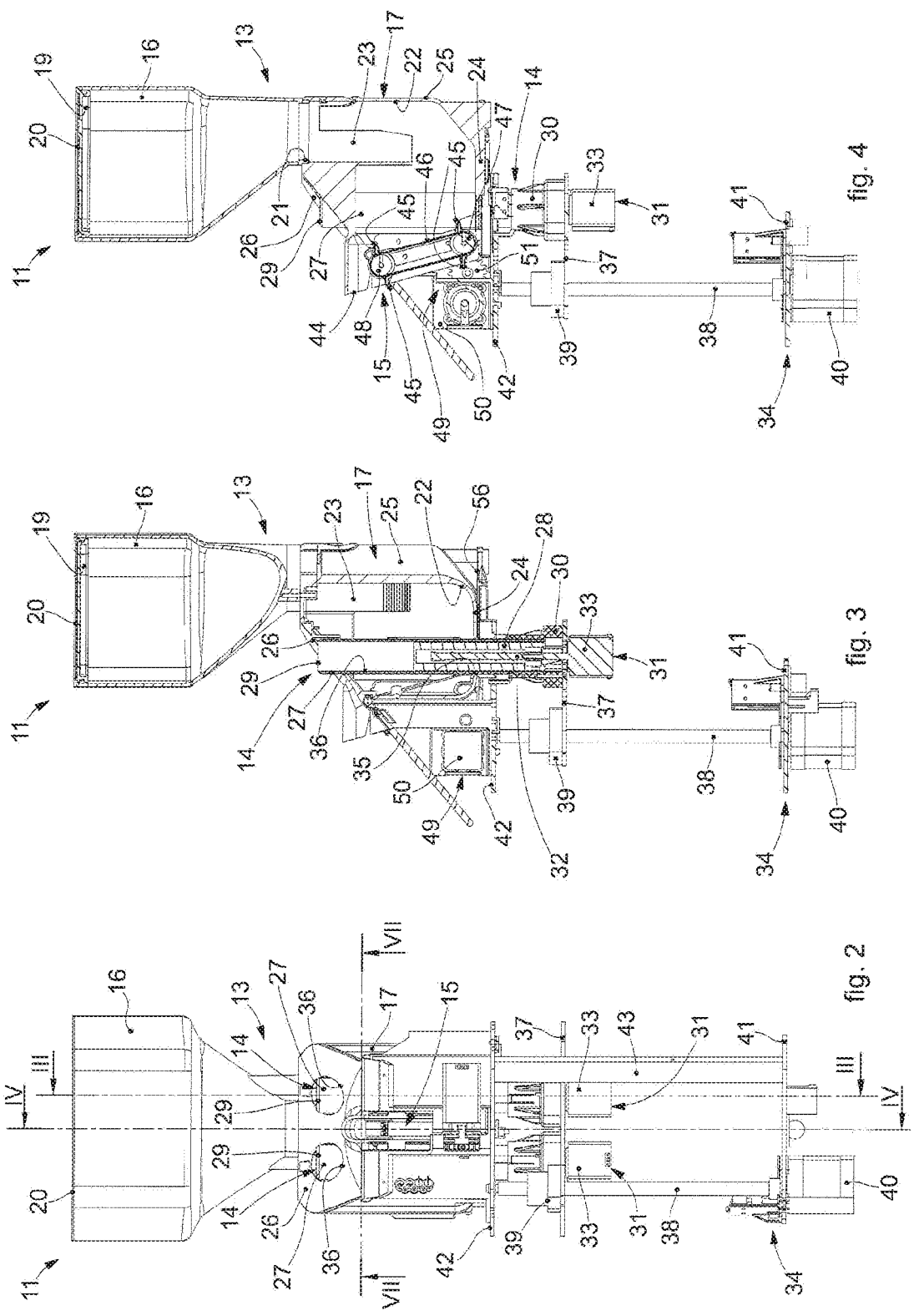

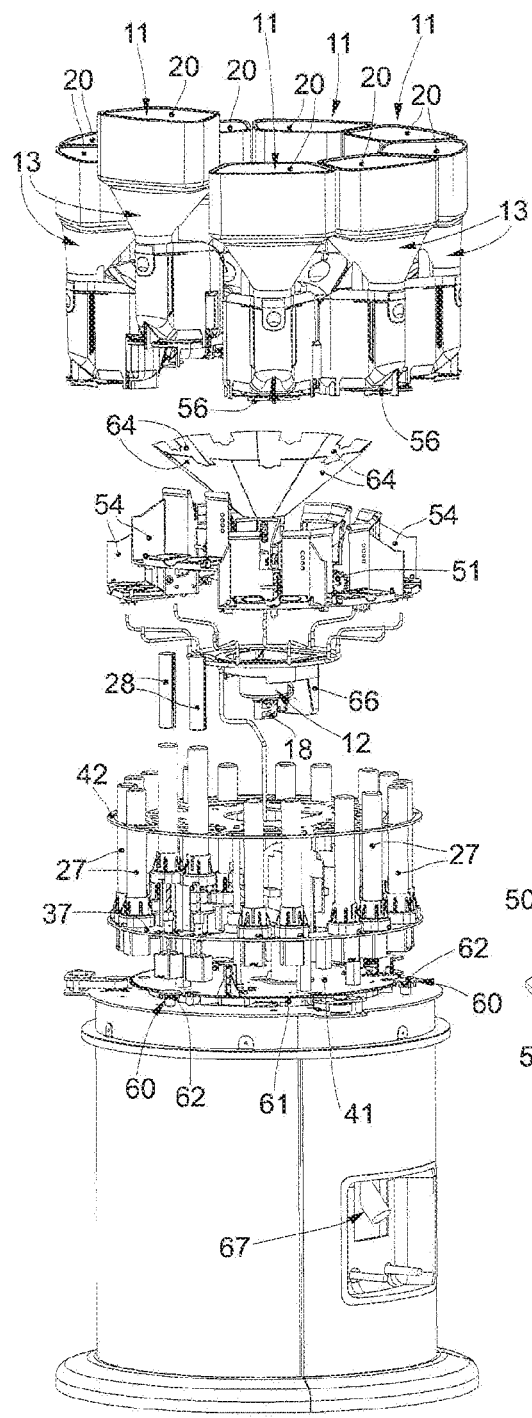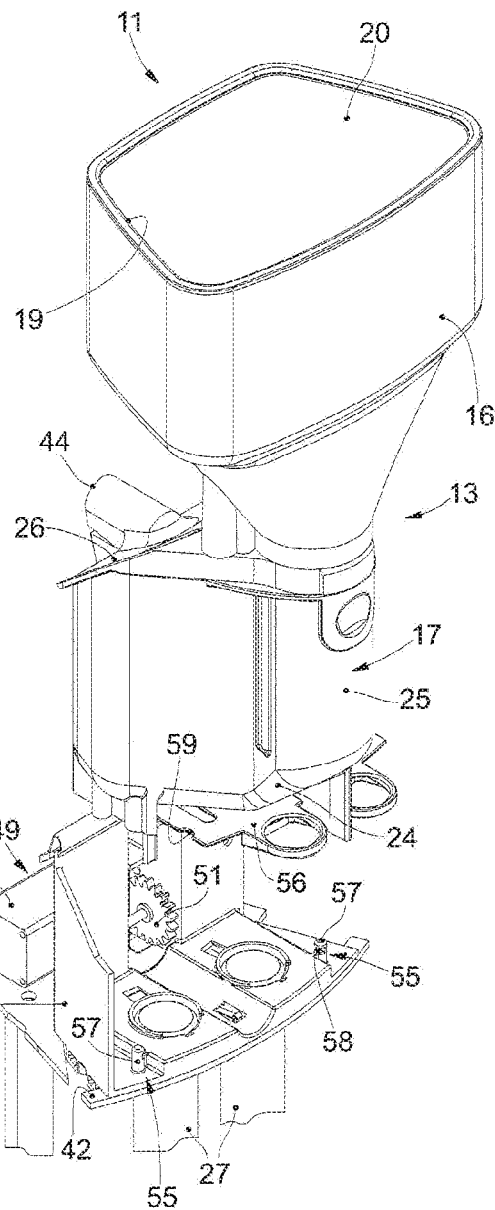
fig. 5
fig. 6

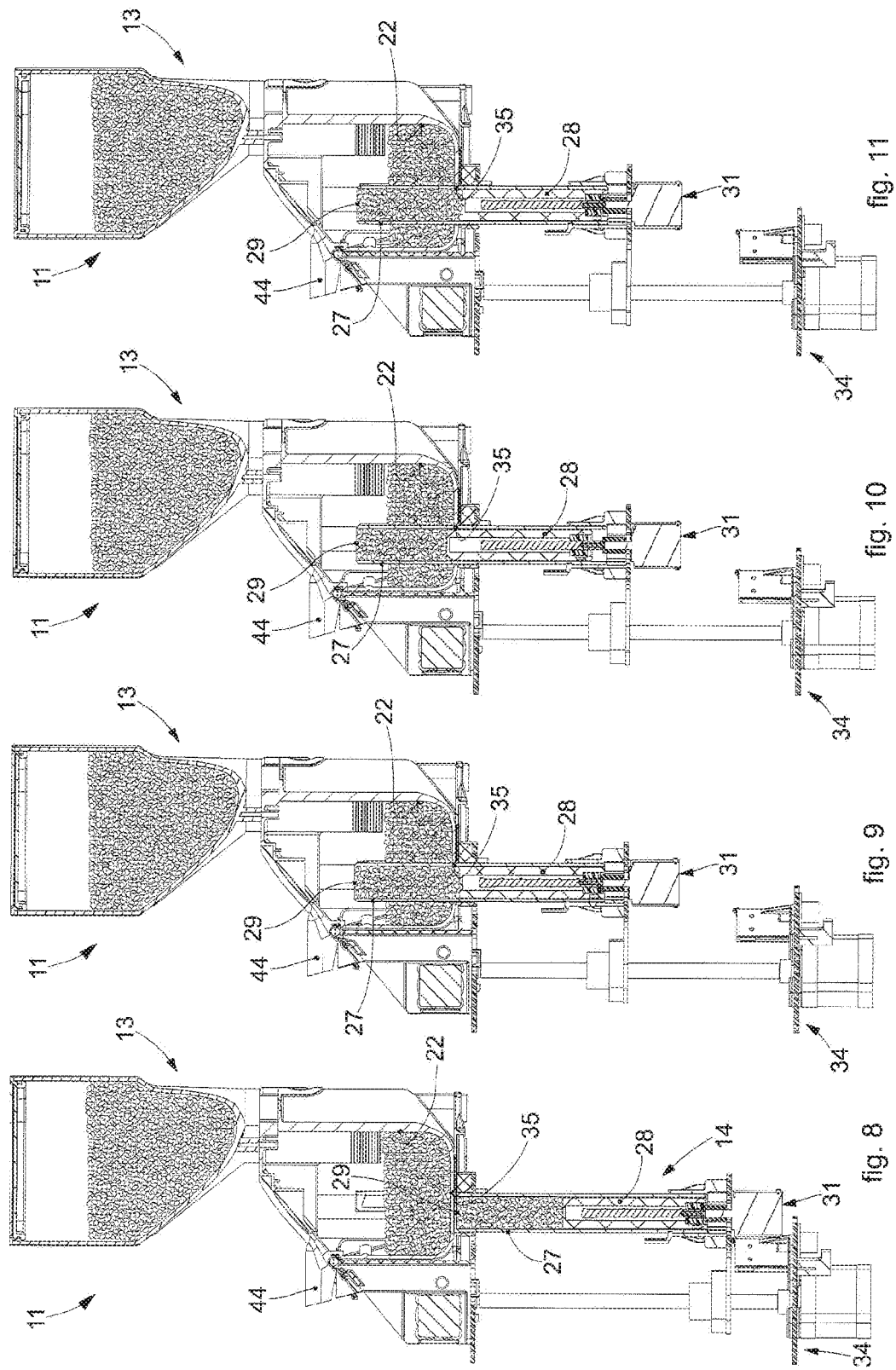

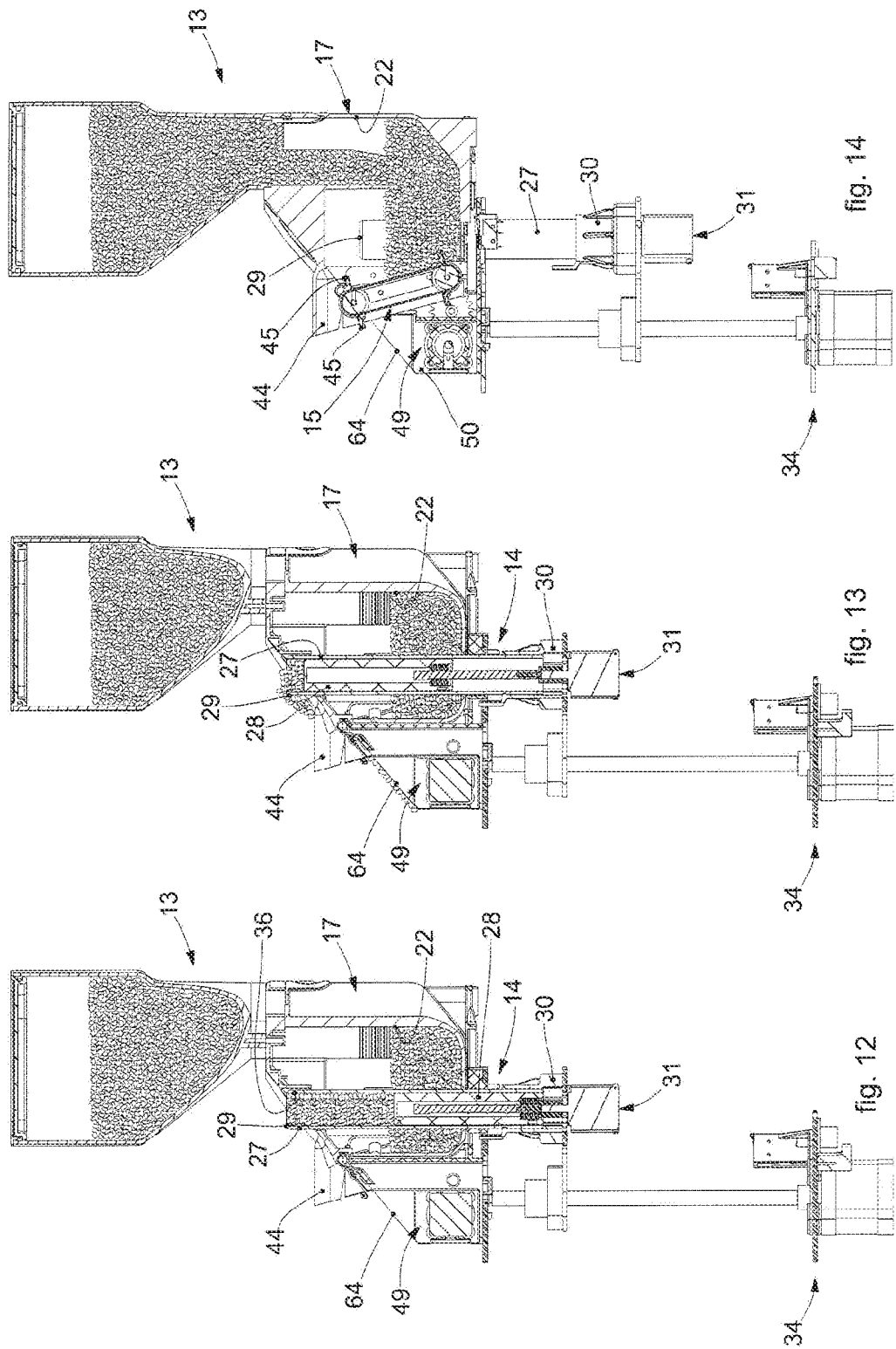

APPARATUS AND METHOD FOR OBTAINING PERSONALIZED BLENDS OF COFFEE

CROSS-REFERENCE TO RELATED APPLICATIONS

This application is a Section 371 of International Application No. PCT/EP2017/074564, filed Sep. 27, 2017, which was published in the English language on Apr. 5, 2018, under International Publication No. WO 2018/060295 A1, which claims priority under 35 U.S.C. § 119(b) to Italian Application No. 102016000096953, filed Sep. 27, 2016, the disclosures of each of which is incorporated herein by reference.

FIELD OF THE INVENTION

Embodiments described here concern an apparatus for obtaining personalized mixtures, or blends, of coffee, used for the subsequent preparation of the coffee drink. The coffee blend is obtained by combining a plurality of types, also known as "origins", of coffee and can be supplied either in the form of coffee beans or powder derived from grinding coffee beans.

BACKGROUND OF THE INVENTION

It is known to prepare the coffee drink by using coffee powder obtained by grinding coffee beans. The coffee drink, hereinafter referred to simply as coffee, is generally obtained by extraction, that is, percolation with boiling water and under pressure. To this end, machines are known for the production of espresso coffee, which are provided with a tank for the water, from which, by means of a pump, the water is delivered at high pressure to a heating unit. From the latter, hot water and/or water vapor is obtained, which is used in a coffee extractor unit, where it is percolated through the powdered coffee to produce espresso coffee.

It is possible to use coffee powder obtained from grinding coffee beans of the same type or variety (origin), or to use a blend of coffee powder obtained by grinding coffee beans of different types or varieties. Examples of machines that allow to obtain personalized blends of coffee are for example described in documents WO-A-2016/026770 and WO-A-2016/113258 in the name of the Applicant and in document U.S. Pat. No. 5,632,449.

Different proportions of different types or varieties of coffee in the powder mix affect the organoleptic properties of coffee prepared with them, such as taste, aroma, acidity, and body.

In coffee drinkers or enthusiasts, even minimum variations in the organoleptic properties are detected and can influence their judgment on the drink and the choice or preference of one blend of powdered coffee obtained by grinding a certain selection of beans of different types of coffee in relationship to another.

There is therefore a need to perfect an apparatus for obtaining coffee blends that can overcome at least one of the disadvantages of the state of the art.

An apparatus for grinding coffee beans is also known from WO-A-2013/160825, which comprises a container for the coffee beans, a first pipe for transferring the coffee beans from the container to a second pipe, a thruster associated with the second pipe, and a grinder associated with one end of the second transfer pipe.

The first and the second pipe both have a diameter that is substantially equal to that of a coffee bean, so that both the first and the second pipes can be filled with a respective row of coffee beans.

The coffee beans present in the container are inserted and aligned in a row in the first pipe. Subsequently, the coffee beans emerge from the first pipe, through one end of the latter, and are introduced through a lateral aperture provided in the second pipe.

The thruster is inserted into the second pipe through a first end of the latter and is able to slide parallel to the oblong development of the second pipe and toward a second end of the latter.

In particular, the thruster thrusts the coffee beans received from the first pipe along the second pipe and toward the grinder that is disposed in correspondence with the second end.

This solution does not allow to meter the coffee beans rapidly and at the same time with high precision. In particular, both the first pipe and the second pipe are closely intercorrelated with each other and all the coffee beans must necessarily pass first, in a row, through the first pipe and subsequently through the second pipe.

Furthermore, the presence of a thruster as described in WO-A-2013/160825 generates the onset of dead times in feeding the coffee beans toward the grinder, due to the repetitive positioning of the thruster.

Another feed apparatus for coffee beans is described in document WO-2016/113258 and comprises a singularizer metering unit to meter the coffee beans in a singularized manner, an incremental weighing unit to weigh the quantity of coffee beans metered by the singularizer metering unit and a control board configured to receive a weight signal from the incremental weighing unit and to calculate the weight of the metered coffee beans.

This solution, however, also requires operations to supply the coffee beans that are extremely complex and costly in terms of time and supply of the coffee beans.

On the contrary, US-A-2012/0024160 describes a cartridge for containing coffee provided with a metering device for metering the coffee beans from the cartridge to a grinder. In this case too, however, it is not possible to make a rapid and accurate metering of the coffee for its subsequent use.

One purpose of the present invention is to provide an apparatus for obtaining personalized coffee blends that can meet the requirements of producing with suitable repeatability, reliability and accuracy, coffee blends obtained from selections of beans of different types or origins of coffee, in particular according to personalized recipes or recipes that can be personalized by a specific user or operator.

Another purpose of the present invention is to provide an apparatus for obtaining coffee blends that allows to dose the various types that make up a blend in an accurate and precise manner.

Another purpose of the present invention is to provide an apparatus for obtaining coffee blends that allows the desired blend to be obtained rapidly and with high precision.

Another purpose of the present invention is to provide an apparatus for obtaining coffee blends that is extremely compact and easy to use.

Another purpose of the present invention is to provide an apparatus for obtaining coffee blends which, once the user has identified one or more specific blends of powdered coffee, can reproduce the specific blends with repeatability and reliability, thus satisfying the taste of the consumers.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, embodiments concern an apparatus for obtaining personalized coffee blends. The apparatus comprises a plurality of supply units, each configured to supply a specific type of coffee bean to a collection container and each provided with at least a containing device in which the coffee beans of the specific type of coffee are contained and with a first volumetric feed device, configured to feed a volumetrically metered quantity of coffee beans of the specific type of coffee beans from the containing device to the collection container.

In accordance with the present description, each supply unit comprises a second singularized feed device configured to feed coffee beans, one at a time, in a singularized manner, from the containing device to the collection container.

Moreover, in accordance with the present description, a weighing unit is provided associated with said collection container to weigh the coffee beans present in the collection container.

Embodiments of the present invention can provide that at least part of the first volumetric feed device and at least part of the second singularized feed device are installed in the containing device. In this way, both the first volumetric feed device and the second singularized feed device can remove, independently from each other, the coffee beans present in the containing device in order to then supply them to the collection container.

Moreover, some embodiments concern a supply unit configured to supply a specific type of coffee beans. The supply unit is provided with at least a containing device in which the specific type of coffee is contained, and with a first volumetric feed device configured to remove a metered quantity of a specific type of coffee beans from said containing device to feed them downstream. According to an embodiment, said supply unit also comprises a second singularized feed device configured to remove coffee beans, one at a time, in a singularized manner, from said containing device in order to feed them downstream.

Some embodiments also concern a method for obtaining personalized blends of coffee. Said method providing to make available a plurality of types of coffee beans in respective containing devices of supply units. In accordance with an embodiment the method comprises:

a first volumetric metering step to feed a first volumetrically metered quantity of coffee beans from one or more of said containing devices to a collection container with a respective first volumetric feed device of the one or more supply units involved, a second singularized metering step, after the first volumetric metering step, to feed coffee beans one at a time, in a singularized manner, from the one or more containing devices used in the first volumetric metering step, to said collection container using a respective second singularized feed device of the one or more supply units involved, a step of weighing the coffee beans contained in said collection container.

In possible implementations, the first volumetric metering step can be carried out at the same time as or sequentially by one or more of the supply units involved.

In other possible implementations, the second singularized metering step can be carried out at the same time as or sequentially by one or more of the supply units involved.

If the first volumetric metering step is carried out sequentially by one or more of the supply units involved, it is possible that after the first volumetric metering step of one specific supply unit, the corresponding second singularized metering step of the supply unit involved will be carried out. Or, alternatively, it can be provided to carry out in sequence all the volumetric metering steps of the supply units involved, after which all the necessary singularized metering steps will be carried out. Furthermore, as another possible alternative, it is possible to combine the manner in which the aforementioned first volumetric metering step and the second singularized metering step are carried out, with the provision that, for each supply unit, the respective and specific first volumetric metering step is carried out before the respective second singularized metering step is carried out by the same supply unit.

In possible implementations, the weighing step can be carried out either after the first volumetric metering step, carried out at the same time as and/or in sequence by all the supply units involved, and before the second singularized metering step, in order to weigh the quantity present in the collection container at the end of the first volumetric metering step, or during and/or after the second singularized metering step, in order to check the weight of the coffee beans progressively introduced one at a time.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein:

FIG. 2 is a front view of a component of the apparatus in FIG. 1;

FIG. 3 is a section view along the line III-III of FIG. 2;

FIG. 4 is a section view along the line IV-IV of FIG. 2;

FIG. 5 is an exploded view of the apparatus in FIG. 1;

FIG. 6 is an exploded view of the component in FIG. 2;

FIGS. 8-14 show an operating functioning sequence of the apparatus in accordance with some embodiments of the invention.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
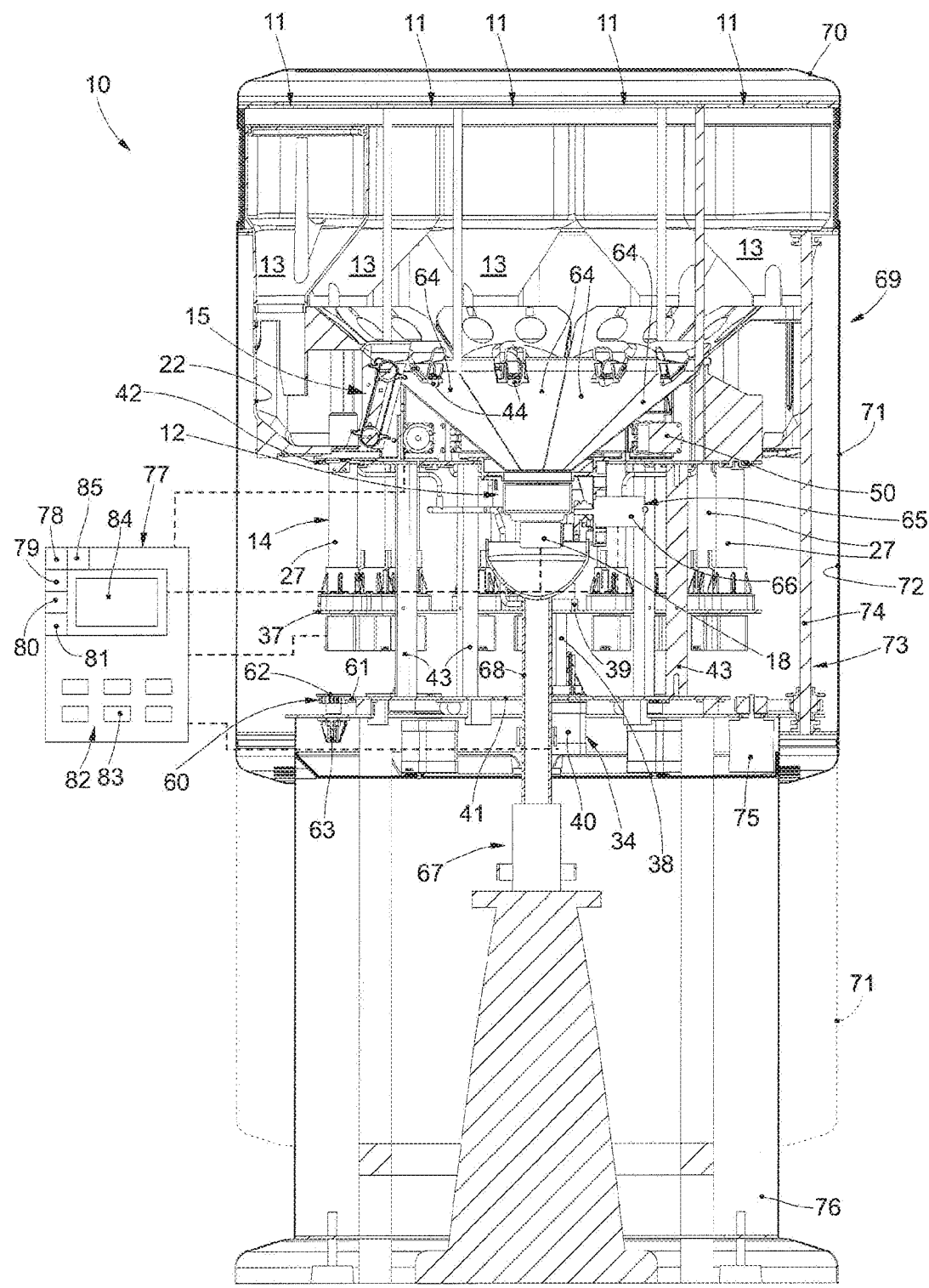
FIG. 1 is a schematic section view of an apparatus for obtaining coffee blends in accordance with some embodiments of the present invention.

We shall now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Embodiments of the present invention concern an apparatus for obtaining coffee blends which is indicated in its entirety in the attached drawings by the reference number 10.

Here and hereafter in the description and claims, the term blend means the combination of two or more types, that is, varieties or "origins" of coffee mixed together, the composition of which is variable within a more or less wide range.

The apparatus 10 according to the present description can be configured to supply personalized blends of coffee in powder or coffee blends in beans to be subjected to subsequent grinding, or both.

Some embodiments provide that the apparatus 10 comprises a plurality of supply units 11 each configured to supply a predefined type or variety of coffee beans to a collection container 12. The collection container 12 is common to the supply units 11 and is provided to receive the coffee beans that are delivered by the supply units 11.

As described in detail hereafter, each of the supply units 11 is configured to supply a first quantity of coffee beans, defined volumetrically, and subsequently a second quantity of coffee beans, one at a time, that is, singularized. The first and second quantities supplied can be received and contained in the collection container 12, defining, overall, the desired final quantity of coffee beans, or the portion of the desired final quantity of coffee beans of that blend which each of the supply units 11 involved and selected for the specific personalized blend selected must provide.

In particular, before delivery of the second quantity, it is possible to control the weight of the first quantity.

Furthermore, the second quantity can be controlled in terms of weight, in particular in a differential manner referring to the weight of the first quantity already delivered and already present in the collection container 12, both by weighing each of the coffee beans introduced on each occasion into the collection container 12, and also by measuring the weight of the total quantity present in the collection container 12 at the end of the delivery of the second quantity.

In this way, the desired final quantity to be delivered for each of the supply units 11 is reached by adding the first quantity, defined volumetrically, to the second quantity, which is gradually delivered in an incremental manner, one coffee bean at a time, so that it is possible to weigh one coffee bean at a time and then assign a specific weight contribution to each coffee bean. In essence, the weight contribution of each single coffee bean is estimated, which is supplied according to the singularized mode and the sum of the beans supplied according to the singularized mode defines the aforementioned second quantity.

In essence, the first quantity of coffee beans defines a first volumetric fraction of the desired final quantity to be delivered for each of the supply units 11. This first volumetric fraction can have a weight estimated in advance, based on the known volume that is delivered, for example, the weight can be estimated based on a known density of the coffee beans, in particular a statistical and/or estimated density. In this context, it is known that coffee beans can have a variability in weight from each other that can be significant, especially considering the accuracy required in the context in question. The weight of the first volumetric fraction can be checked, by weighing, before the second quantity of coffee beans is delivered.

The second quantity is, therefore, a second fraction of the desired final quantity to be delivered for each of the supply units 11 which, in addition to the first quantity already present, is incrementally supplied in the collection container 12 according to the singularized mode, one coffee bean at a time, each coffee bean being weighed on each occasion until the desired quantity of weight is reached, which weight is controlled by weighing the content of the collection container 12, both incrementally and as a control of the final weight. In essence, in this way it is possible to count the individual coffee beans and the individual weight contributions of each coffee bean supplied in the singularized mode.

The above applies for each of the supply units 11 and it is clear that, for example, if it is necessary to supply coffee beans from different supply units 11, in order to satisfy the need for specific personalized blends, each of the supply units 11 is made to operate as described above.

Supplying the overall quantity of coffee beans for the specific personalized blend from each of the supply units 11 involved by means of a first quantity defined volumetrically and a second quantity according to the singularized mode allows an optimal compromise between accuracy of the desired final weight of the blend of coffee beans and the rapid execution and completion of the blend of coffee beans itself.

In this context, according to possible embodiments and variants, the supply units 11 involved in supplying the coffee beans that will compose the specific personalized blend selected can be simultaneously activated in parallel, to each supply a portion of the overall quantity of coffee beans of the specific personalized blend selected, said portion which, as explained above, consists of, for each supply unit 11, a first quantity supplied volumetrically and a second quantity supplied in singularized mode, in practice by weighing the coffee beans one by one. This possible variant embodiment, that is, the simultaneous delivery or launch, that is, in parallel, from the supply units 11 involved, can result in an increase in the speed, and hence a reduction in the times required to obtain the desired blend.

Alternatively, according to other embodiments, the supply units 11 involved in supplying the coffee beans that will constitute the specific personalized blend selected can be activated in sequence, to perform deliveries or launches in series, that is, to supply one at a time, in series, a portion of the overall quantity of coffee beans of the specific personalized blend selected.

For example, it is possible that first the supply units 11 involved are activated in sequence, so that each provides the first volumetrically defined quantity, at the end of this volumetric delivery sequence, to activate the supply units 11 in sequence for sequential delivery, by each of the supply units 11, of the second quantity of coffee beans in singularized mode.

It is also possible that the supply units 11 involved are activated in sequence so that each of them completes the delivery, that is, it launches the quantity provided before a subsequent supply unit 11 is activated, both of its own first volumetrically defined quantity and also of its second quantity, defined in the singularized mode, so that each provides its own part of the overall quantity required.

In these possible variant embodiments that provide sequential activation, it is therefore possible to control the weight in sequence not only of the second quantity supplied in the singularized mode by each of the supply units 11, but also of the first volumetrically defined volume and supplied in series by each of the supply units 11 involved. This sequential delivery approach, therefore, allows to increase the accuracy of the final weight of the mixture of coffee beans obtained. Each supply unit 11 is provided with at least one containing device, or receptacle 13, in which the specific type of coffee is contained.

Furthermore, each supply unit 11 comprises a first volumetric feed device 14 configured to feed a volumetrically metered quantity of coffee beans of the specific type of coffee beans from the containing device 13 to the collection container 12. According to the present description, the first volumetric feed device 14 is used to supply the first quantity of coffee beans, defined volumetrically as described above.

Additionally, each supply unit 11 comprises a second singularized feed device 15 configured to feed one by one, in singularized mode, coffee beans from the containing device 13 to the collection container 12. According to the present description, the second singularized feed device 15 is used to supply the second quantity of coffee beans, one at a time, that is, singularized, as described above.

Furthermore, the apparatus 10 comprises a weighing unit 18 associated with the collection container 12 to weigh the coffee beans present in the collection container 12. In particular, the weighing unit 18 is configured to weigh the coffee beans supplied by the supply units 11 and received in the collection container 12 as described above. In some embodiments, it can be provided that the collection container 12 is associated with, or included in, the weighing unit 18. In possible implementations, it can be provided that the weighing unit 18 can weigh incrementally on each occasion, both the first quantity of coffee beans, delivered volumetrically, and also the second quantity delivered in singularized mode, which are supplied by one or more of the individual supply units 11, according to the specific operating modes selected.

According to possible embodiments, which can be combined with all the embodiments described here, the weighing unit 18 can comprise one or more load cells, one or more pressure sensors, or one or more other sensors, which use an extensometer, a piezoelectric element, a piezo resistive element, a Hall-effect element, or suchlike.

In some embodiments, the containing device 13 comprises at least one compartment 22 in which the predefined type of coffee beans is contained.

According to some embodiments, the containing device 13 can comprise at least one loading hopper 16 in which a predefined quantity of coffee beans is contained, and a containing body 17 associated with the loading hopper 16 and configured to receive from the latter a predefined quantity of coffee beans.

The loading hopper 16 can, for example, be selectively coupled with/detached from the containing body 17 for example to allow maintenance operations.

The loading hopper 16 can be provided with a first aperture 19 provided to allow the coffee beans to be supplied and with which a lid 20 can be associated, to selectively close the loading hopper 16, thus preventing, for example, exposure of the coffee beans contained therein to the atmosphere outside the loading hopper 16, advantageously preserving their organoleptic properties.

The loading hopper 16 is also provided with a second aperture 21 positioned in this specific case opposite the first aperture 19 and communicating with the containing body 17.

The containing body 17 defines the compartment 22 in which a predetermined quantity of coffee beans is contained and are discharged from the loading hopper 16.

The containing body 17 is provided with a tubular element 23 having a first end connected to the second aperture 21 of the loading hopper 16 and a second end, opposite the first and located inside the compartment 22.

The level of positioning of the second end of the tubular element 23 in the compartment 22 defines the level of the coffee beans filling the compartment 22 itself.

By way of example only, it can be provided that the second end of the tubular element 23 is positioned with respect to the bottom of the containing body 17 at about 0.3 to 0.7 times the overall height of the latter.

In this way, only part of the compartment 22 of the tubular element 23 is filled with coffee beans, while the remaining part, located at the top, is free from beans.

According to possible solutions of the invention, the containing body 17 can be defined by a bottom wall 24, lateral walls 25 and an upper wall 26.

The first volumetric feed device 14 and the second singularized feed device 15 are at least partly disposed in the compartment 22.

In some embodiments, the first volumetric feed device 14 is distinct and separate from the second singularized feed device 15.

In particular, the first volumetric feed device 14 can be selected from a group comprising a volumetric transport member, a pneumatic transport member, a belt transport member, a vibration transport member, a screw transport member, a cup-type transport member.

According to embodiments described using FIGS. 1-3, the first volumetric feed device 14 can comprise a transport device of the volumetric type, configured to remove, on each occasion, a predefined volumetric quantity of coffee beans from the compartment 22 and deliver it to the collection container 12.

According to the embodiments shown in the drawings, each supply unit 11 can be provided with two first volumetric feed devices 14, although a different number is not excluded, for example a single volumetric feed device 14 or more than two, for example, three, four or more first volumetric feed devices 14.

According to a possible solution described using FIGS. 2 and 3, the first volumetric feed device 14 can comprise at least one containing element 27, mobile in the compartment 22 of the containing body 17, to allow it to be filled with coffee beans, and an ejector element 28 associated with the containing element 27 and configured to discharge the coffee beans contained in the containing element 27.

In some embodiments of the present invention, the containing element 27 has a tubular conformation and the ejector element 28 is positioned mobile inside it.

In particular, the containing element 27 is provided with an introduction end 29 open toward the outside and through which the coffee beans are introduced, and an attachment end 30 in which the ejector element 28 is positioned mobile, toward the inside of the containing element 27.

According to possible embodiments, the containing element 27 has a tubular circular cross-section shape, that is, it can be a hollow cylinder, although it is not excluded that its shape can be different, for example, rectangular, polygonal, or mixed polygonal-curved. In the same way, the ejector element 28 can be, for example, a solid cylinder, slidable linearly inside the cylindrical containing element 27.

According to a possible solution, the containing element 27 and the ejector element 28 can have a conformation similar to that of an alternating linear actuator, that is, in which the external sleeve of the linear actuator defines the containing element 27 while the piston, alternately mobile along the sleeve, defines the ejector element 28. The chamber with the alternately variable volume defined between the sleeve and the piston that can slide linearly in it therefore defines the volume for containing the coffee beans, and the alternate sliding of the piston with respect to the sleeve determines, on each occasion, the filling and expulsion of the coffee beans from the chamber.

In possible solutions, the containing element 27 is connected to an actuation device 34 configured to move the containing element 27 into the housing 22 of the containing body 17.

In the solutions shown in FIG. 3, the containing device 13, in this specific case the containing body 17, is provided with at least a through aperture 35 made in the bottom wall 24 and at least one discharge aperture 36 made in the upper wall 26 and vertically aligned with the through aperture 35.

The containing element 27 is installed mobile in the through aperture 35 and the actuation devices 34 are configured to move the containing element 27 to a loading position in which the containing element 27 is disposed with its introduction end 29 in the compartment 22, advantageously in a position near the bottom wall 24, to receive the coffee beans, and to a discharge position in which the containing element 27 is positioned protruding, with its introduction end 29, from the discharge aperture 36 to allow the subsequent discharge of the coffee beans.

According to possible solutions, the actuation device 34 is configured to move together both the containing element 27 and the ejector element 28.

According to possible solutions, with the through aperture 35 or the through apertures 35, if there are more than one, a closing element 56 can be associated, provided to selectively close/open the through apertures 35 and allow the insertion of the containing elements 27 into the compartment 22.

The closing element 56 allows to remove and reposition the containing device 13, preventing possible spills of coffee beans.

According to a possible solution, the closing element 56 can be defined by a guillotine valve.

According to possible embodiments, if the supply units 11 are provided with a plurality of first volumetric feed devices 14, it can be provided that the actuation device 34 is configured to move together all the containing elements 27 of the same supply unit 11, for example by installing the respective containing elements 27 on the same support body.

In embodiments described using FIGS. 2 to 4, the containing elements 27 of all the supply units 11 are installed on a common support body 37, and the actuation device 34, common to all the first volumetric feed devices 14, is configured to move the support body 37, and hence all the containing elements 27 in the respective containing bodies 17 by alternately taking them to their loading and unloading position.

According to some embodiments, the actuation device 34 can be selected from a group comprising at least one of either a worm screw mechanism, a jack, a linear actuator, a rack system, or comparable and similar mechanisms.

According to embodiments described using FIGS. 2-5, the actuation device 34 comprises a female screw 39 attached to the support body 37, a worm screw 38 screwed into the female screw 39, and an electric motor 40 configured to make the worm screw 38 rotate and determine the movement of the support body 37 and therefore of all the containing elements 27 associated therewith.

The worm screw 38 and the electric motor 40 can be installed on a support platform 41 configured to support both the worm screw 38 and also the support body 37 that is mobile with the worm screw 38.

According to possible embodiments, all the containing bodies 17 of the supply units 11 are installed on a common support plate 42.

The support plate 42 is in turn supported by the support platform 41 by means of spacer elements 43, or vertical uprights, which also have the function of keeping the support plate 42 distanced from the support platform 41.

Between the support plate 42 and the support platform 41, the support body 37 is installed mobile, by means of the actuation device 34.

The containing elements 27 are installed on the support body 37, with the respective attachment ends 30.

According to possible embodiments, each first volumetric feed device 14 is provided with at least one movement member 31 configured to move the ejector element 28 into the containing element 27 and determine the discharge of the coffee beans contained in the latter.

The movement member 31 can be selected from a group comprising a worm screw mechanism, a linear actuator, for example the pneumatic or hydraulic type, or comparable and similar mechanisms.

According to embodiments described using FIG. 3, the movement member 31 comprises a worm screw mechanism 32 (FIG. 3) associated with the containing element 27 and the ejector element 28, and a motor 33 configured to make the worm screw mechanism 32 rotate and determine the movement of the ejector element 28 in the containing element 27.

By making the worm screw mechanism 32 rotate, a simultaneous movement of the ejector element 28 in the containing element 27 is determined, which takes it from a position close to the attachment end 30, in which a loading chamber is defined for the coffee beans, with a volume suitable to contain a desired quantity of coffee beans, to a position close to the introduction end 29, in which the volume of the chamber is gradually reduced, until it can possibly be zeroed if it is necessary to expel all of the coffee beans contained, thus determining the expulsion of the desired volumetric quantity of coffee beans. Indeed it is clear that, if it is desired to provide a limited fraction of the overall volumetric quantity of coffee beans contained in the containing element 27, the travel of the ejector element 28 is calibrated according to requirements.

In particular, by suitably managing the positioning of the ejector element 28 in the containing element 27, the loading volume of the coffee beans is also determined and, therefore, it is possible to obtain a desired adjustment of the volumetric quantity which is then discharged into the collection container 12 on each occasion.

According to possible embodiments, the motor 33 can be attached to the support body 37 and mobile with it.

As described above, the second singularized feed device 15 can be installed in the compartment 22 of the containing body 17 and is configured to supply the coffee beans in a singularized manner, that is, one coffee bean at a time to the collection container 12.

According to possible solutions, the second singularized feed device 15 can comprise at least one of either a singularization member with a rotating drum, a singularization member with a vibrating channel, a suction singularization member, a centrifugal effect singularization member, a worm screw singularization member.

According to possible embodiments of the invention, the containing device 13, in this case, the containing body 17, is provided with a delivery aperture 44, made in this specific case in the upper wall 26, and the second singularized feed device 15 is configured to remove one coffee bean from the compartment 22 on each occasion and discharge it through the delivery aperture 44.

According to possible solutions, the second singularized feed device 15 comprises at least one gripping and delivery element 45 mobile between a position inside the compartment 22 to remove a coffee bean, and a position to deliver the coffee bean through the delivery aperture 44.

According to possible embodiments, several gripping and delivery elements 45 can be provided, each of which is configured to remove and deliver a coffee bean.

According to embodiments described using FIG. 4, the gripping and delivery elements 45 are installed on a closed-loop belt 46 installed in a vertical or sub vertical position in the compartment 22 of the containing body 17.

According to a possible embodiment, the gripping and delivery element 45 can have an at least partly concave conformation, for example like a spoon, and suitable to accommodate only one coffee bean. When the single coffee bean is gripped and moved toward the delivery aperture 44, the concave portion of the gripping and delivery element 45 faces upward during use.

Figure 7:
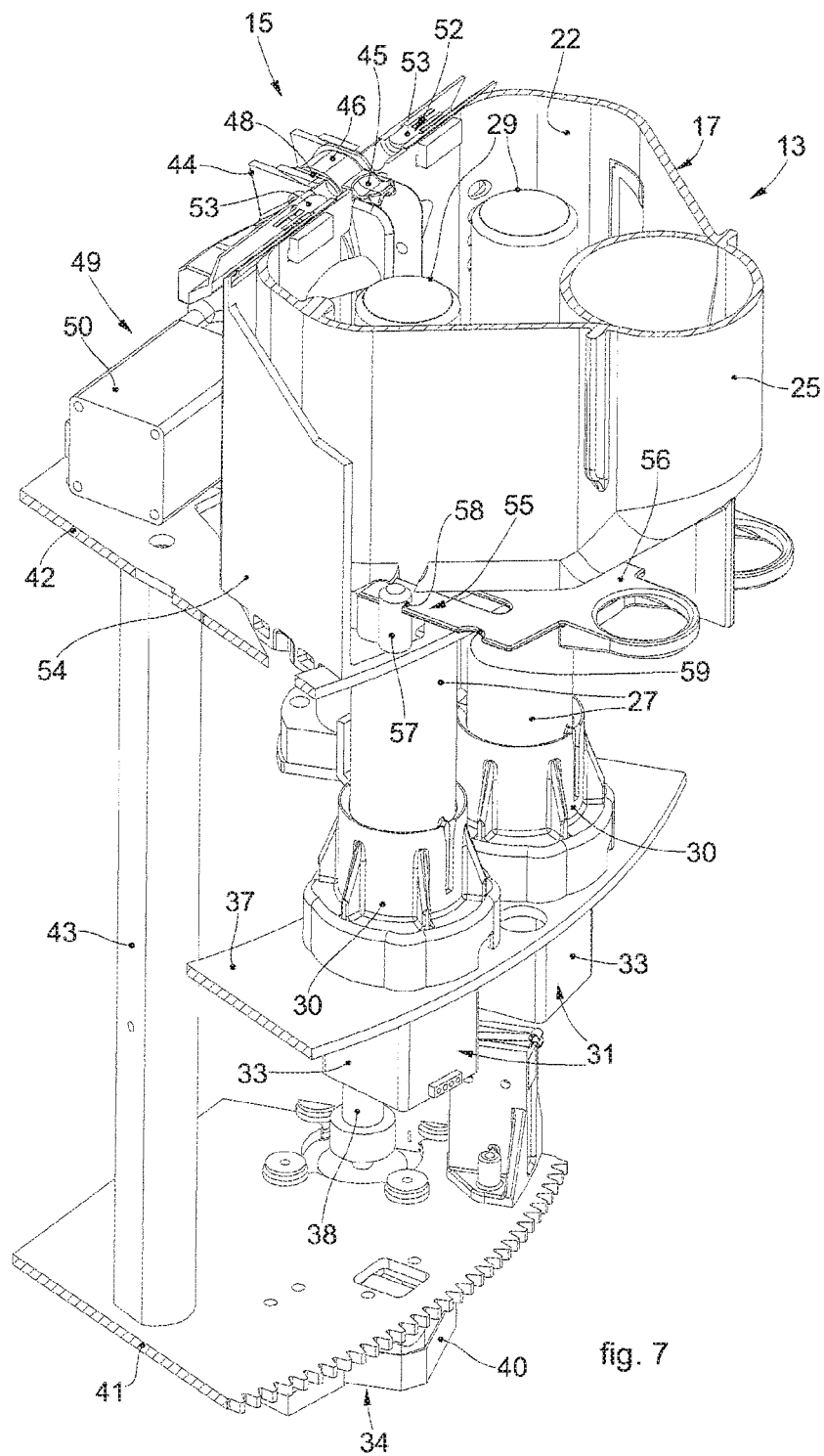
FIG. 7 is a perspective view, sectioned along the line VII-VII of FIG. 2.

In particular, the closed-loop belt 46 is wound between a first pulley 47 (FIG. 4) and a second return pulley 48 (FIGS. 4 and 7), respectively positioned one in correspondence with the bottom wall 24 of the containing body 17 and one in correspondence with the delivery aperture 44.

The first pulley 47 is immersed during use in the coffee beans present in the compartment 22, while the second pulley 48 is installed above the filling level of the compartment 22, that is, above the level at which the second end of the tubular element 23 is positioned.

A drive device 49 is associated with at least one of either the first pulley 47 or the second pulley 48, in the case shown here with the first pulley 47, and is configured to make the closed-loop belt 46 rotate and move the gripping and delivery elements 45 between the removal position and the delivery position, and between the delivery position and the removal position.

The drive device 49 can comprise a drive member 50 and motion transmission members 51, provided to transfer the motion from the drive device 49 to the drive member 50.

According to embodiments described using FIG. 4, the transmission members 51 can comprise motion transmission gears, for example interposed between a drive toothed wheel associated with the drive member 50 and a driven toothed wheel associated with the first pulley 47.

According to possible solutions (see, for example, FIG. 7), a detection device 52, configured to detect the delivery of each single coffee bean to the collection container 12, can be associated with the second singularized feed device 15. Advantageously, therefore, by means of the detection device 52, the coffee beans provided in singularized mode by the second singularized feed device 15 can be counted one by one.

The detection device 52 can be installed in correspondence with the delivery aperture 44 to detect the coffee beans that are delivered on each occasion.

The detection device 52 can comprise sensors 53 located in opposite positions of the delivery aperture 44, each of which is configured to detect the presence of a coffee bean contained in the gripping and delivery element 45 before or during discharge from the latter.

The detection device 52 can comprise at least one of either an optical sensor, an inductive sensor or a capacitive sensor.

According to possible solutions, each containing device 13 can be installed on the support plate 42.

According to possible embodiments, each containing device 13 is installed, in a selectively removable manner, on the support plate 42 by means of a positioning body 54 attached to the latter. The positioning body 54 allows to define a precise positioning of each containing device 13 with respect to the support plate 42 whenever the containing device 13 is removed and repositioned on the latter, for example for filling the containing device 13 with coffee beans.

According to possible solutions, rapid coupling members 55 (see, for example, FIGS. 6 and 7) are provided between the positioning body 54 and the containing device 13, to attach the containing device 13 to the positioning body 54.

The rapid coupling members 55 can include at least one of either snap-in coupling elements, bayonet coupling elements, interference coupling elements.

According to possible solutions, the rapid coupling members 55 can be associated with the closing element 56 and the positioning body 54 and are configured to define the attachment of the containing device 13 to the positioning body 54 when the closing element 56 is in the open condition of the through apertures 35, while they are configured to allow the release of the containing device 13 from the positioning body 54 when the closing element 56 is in its closed condition of the through apertures 35.

In particular, it can be provided that the rapid coupling members 55 comprise a positioning pin 57 associated with the positioning body 54 and provided with a clamping groove 58 while the closing element 56 comprises a recess 59 through which the positioning pin 57 can be partly inserted.

In particular, in the closed position of the closing element 56, the containing device 13 is housed in the positioning body 54 by inserting the recess 59 through the positioning pin 57.

Once the containing device 13 is positioned in the positioning body 54, the closing element 56 is brought into the open condition.

In this condition, the closing element 56 couples with the clamping groove 58 of the positioning pin 57, determining the firm constraint of the containing device 13 with the positioning pin 57. This avoids having to remove the containing device 13 from the positioning body 54 leaving the through apertures 35 open and thus causing unintended loss of coffee beans.

According to embodiments described using FIG. 6, the drive member 50 and at least part of the transmission members 51 are installed on the support plate 42, and when the containing devices 13 are associated with the support plate 42, the transmission members 51 are coupled, on each occasion, with the other part of the transmission members 51 associated with the respective first pulleys 47 (FIG. 4) that move the closed-loop belts 46.

According to possible embodiments described using FIGS. 1 and 5, the containing devices 13 of the supply units 11 are installed according to a pattern on the perimeter of a circumference to define a carousel structure of the apparatus 10.

According to some embodiments, it can be provided that the supply units 11 are installed on the support platform 41 and that rotation members 60 are associated with it, configured to make the support platform 41 rotate, that is, the support plate 42, around an axis of rotation passing through the center of the circumference according to which the supply units 11 are disposed.

The rotation members 60 allow to take, on each occasion, a supply unit 11 to a predefined position, for example to allow operations to replace the containing devices 13 or to facilitate maintenance operations of the apparatus 10.

According to embodiments described using FIGS. 1 and 5, the rotation members 60 comprise a toothed crown 61 associated with the support platform 41 and at least a drive toothed wheel 62 engaging on the toothed crown 61. A motor 63 is associated with the drive toothed wheel 62 and is configured to make the drive toothed wheel 62 and consequently the support platform 41 rotate.

According to possible variants, not shown in the drawings, the containing devices 13 of the supply units 11 can be disposed one in series to the other, for example aligned along a straight or curvilinear axis.

According to possible solutions, the apparatus 10 comprises a conveying body 64 associated with the supply units 11 and configured to receive the coffee beans from them and to convey them to the collection container 12.

According to possible solutions, each supply unit 11 comprises a delivery element associated with at least part of the first volumetric feed device 14 and the second singularized feed device 15 and in which the coffee beans of one and the other feed device are delivered.

The delivery elements of the supply units can, as a whole, define the conveying body 64.

According to embodiments described using FIGS. 1 and 5, the conveying body 64 has a substantially funnel conformation, with the wide portion facing toward the discharge apertures 36 of the supply units 11 and the narrow portion facing toward the collection container 12.

According to a possible solution (see, for example, FIG. 1), the collection container 12 is associated with a discharge member 65 provided to discharge from the collection container 12 the coffee beans received.

According to possible solutions, the discharge member 65 can comprise a motor 66 connected to the collection container 12 and provided to rotate the collection container 12 and determine the discharge by gravity of the coffee beans.

According to possible embodiments, downstream of the collection container 12 a grinding device 67 is provided, configured to grind the coffee beans discharged from the collection container 12.

According to embodiments described using FIG. 1, a conveying channel 68 is installed between the collection container 12 and the grinding device 67, to convey the coffee beans from the collection container 12 to the grinding device 67.

In possible embodiments, not shown, which can be combined with all of the embodiments described here, it can be provided that downstream of the grinding device 67 a coffee preparation station is installed, able to produce the coffee drink, in particular espresso coffee, from the blend of coffee powder obtained.

According to a possible variant embodiment, not shown, it can be provided that, downstream of the collection container 12 and/or possibly downstream of the grinding device 67, the apparatus 10 comprises a vacuum packing device configured to vacuum pack in a suitable package, envelope or bag, the metered coffee beans or the coffee powder produced by the grinding device 67, in case they are not used immediately but are supplied for later use.

According to another solution, the apparatus 10 can also comprise a protective casing 69 configured to contain inside it at least the supply units 11 and the collection body 12.

The protective casing 69 allows to generate a closed environment with controlled conditions suitable to preserve the organoleptic properties of the coffee beans.

According to possible solutions, suitable devices to feed inert gas inside the protective casing 69 can be associated with the protective casing 69 to guarantee the preservation of the coffee beans.

By way of example only, it can be provided to introduce nitrogen inside the protective casing 69.

According to possible solutions, the protective casing 69 comprises at least one lid 70, in this case associated with the upper part of the containing devices 13, and a covering body 71, selectively associable with the lid 70 to define a closed compartment 72 to contain the supply units 11 and the collection container 12.

Movement members 73 are associated with at least one of either the lid 70 or the covering body 71 and are provided to reciprocally distance from each other the lid 70 from the covering body 71 and to allow access to the closed compartment 72, for example to replace or fill the containing devices 13.

The movement members 73 comprise, in embodiments described using FIG. 1, a worm screw 74 attached to the covering body 71 and selectively rotatable by a motor 75 to determine the movement of the covering body 71.

The motor 75 is installed in a fixed position with respect to a support base 76 of the apparatus 10.

The apparatus 10 can also include, in some embodiments, a management and control unit 77, provided and configured to manage the functioning of the individual supply units 11, as well as all the other possible drive components present.

According to some embodiments, which can be combined with all of the embodiments described here, the management and control unit 77 can be configured to receive a weight signal from the weighing unit 18, to calculate the weight of the coffee beans metered in the collection container 12.

In particular, the management and control unit 77 is configured to manage at least the functioning of the first volumetric feed device 14 and the second singularized feed device 15 of each supply unit 11, managing in an appropriate manner the times and drive sequence of each feed device.

In particular, by driving the first volumetric feed devices 14 it is possible to generate in a very short time a volumetric delivery of coffee beans very close to the desired one, generally always lower than but close to the desired one, while with the second singularized feed devices 15 a singularized delivery of the coffee beans is generated, that allows to manage with care and precision the overall delivery of coffee beans.

By way of example only, it can be provided that with the first volumetric feed devices 14 of each supply unit 11 a quantity in weight of between 80% and 98% of the total desired for the specific type of coffee is supplied, while with the second singularized feed devices 15 a supply of between 2% and 20% of the specific type of coffee is generated.

The actuation of the first volumetric feed devices 14 and the second singularized feed devices 15 can be managed by the management and control unit 77 according to the weight data detected by the weighing unit 18 on each occasion.

By properly managing the data detected by the weighing unit 18, in fact, it is possible to control and adjust the final weight of both the specific type of coffee and also the final blend obtained. In fact, the weighing unit 18 can weigh the quantity of coffee beans delivered by each supply unit 11, that is, by the respective first volumetric feed 14 and the respective second singularized feed device 15, and the weight detected can be monitored and controlled by the management and control unit 77.

In this way, the apparatus 10 and the method according to the present description can be configured to deliver the quantity of coffee beans in two steps, or successive phases, in which in a first step, with the first volumetric feed devices 14, a quantity of weight is delivered that is always less than the final target weight, and in a second step the differential quantity is delivered precisely, for example by adjusting the second singularized feed device 15 to provide a slower singularized stream of coffee beans, until the desired final quantity is incrementally reached. This solution is very precise in terms of the final weight achieved since, given the singularized flow of coffee beans, it is possible to identify and quantify the contribution by weight of each coffee bean that is delivered, and to consequently adjust it, by means of the management and control unit 77. In this way, it is possible to overcome the problem of the possible great variability in the weight of the coffee beans as discussed above, obtaining very precise, reliable and repeatable quantities in weight of the coffee beans.

Consequently, the apparatus 10 allows to produce with adequate repeatability and reliability blends of coffee powder obtained by grinding selections of beans of different types of coffee, in particular according to recipes personalized or able to be personalized by a specific user or operator. Thanks to the apparatus 10, moreover, once the user has identified one or more specific blends of powdered coffee, he can reproduce repeatedly and reliably the specific blends of powdered coffee, thus satisfying the consumers' tastes.

Driving the first volumetric feed devices 14 or the second singularized feed devices 15 can take place simultaneously for all the supply 11 units, or sequentially for each supply unit 11, as described above.

According to embodiments described, for example, using FIG. 8, which can be combined with all of the embodiments described here, the management and control unit 77 can include a central processing unit (CPU) 78, a possible electronic memory 79, possibly an electronic database 80, a power module 81 and auxiliary circuits (or I/O) (not shown). For example, the CPU 78 can be any form of computer, microcomputer, processor or microprocessor used in the field of control, automation, management of the work cycle or in the IT field.

The electronic memory 79 can be connected to the CPU 78 and can be one of those commercially available, such as a random access memory (RAM), a read-only memory (ROM), an erasable programmable ROM memory (EPROM), an electrically erasable programmable ROM memory (EEPROM), floppy disk, hard drive, optical disks, CD-ROMs, and magneto-optical disks, optical or magnetic cards, mass memory, solid state memory cards or microcards, or any other form of digital, local or remote storage. For example, data concerning the actual weight measured, the target weight of coffee beans to be reached, and/or the proportions of one type or variety of coffee, and the other, that is, the recipes of one or more specific coffee blends, as well as any historical data or errors may be stored in the electronic memory 79. If necessary, the target weight of the coffee beans to be reached, and/or the proportions of one type or variety of coffee, and the other, that is, the recipes of one or more specific coffee blends can be stored, in addition or alternatively, in the possible electronic database 80 when present. The software instructions and the data may be coded and stored for example in the electronic memory 79 in order to command the CPU 78. The auxiliary circuits can also be connected to the CPU 78 to help the processor in a conventional manner Auxiliary circuits can include for example at least one of either: cache circuits, power circuits, clock circuits, input/output circuitry, subsystems, and suchlike.

A program (or computer instructions) readable by the management and control unit 77 can determine which tasks can be done in accordance with the method according to the present description. In some embodiments, the program is a software readable by the management and control unit 77 or by a local or remote computer system. The management and control unit 77 or local or remote computer system can include a code to generate and memorize information and data introduced or generated during the course of the method according to the present description.

Some embodiments can provide the execution of various steps, passes and operations, as described above. These steps, passes and operations can be carried out by means of instructions from a machine or control board of an apparatus according to the present description which cause the execution of certain phases by a general-purpose or special-purpose processor. Alternatively, the steps, passes and operations can be performed by specific hardware components that contain hardware logic to carry out the steps, or any combination of programmed computer components and personalized hardware components.

Embodiments of the method for the metered feeding of coffee beans or the preparation of a coffee drink according to the present description can be included in a computer program that can be memorized in a computer-readable mean containing instructions that, when performed by the apparatus for the metered feed of coffee beans or in a coffee-preparation station according to the present description, determine the execution of a method for the metered feeding of coffee beans or the preparation of a coffee drink as described here.

In particular, elements according to the present invention can be supplied as machine-readable means to memorize the instructions which can be carried out by the machine. The machine-readable means can include, without being limited to, floppy disks, optical disks, CD-ROM, optical-magnetic disks, ROM, RAM, EPROM, EEPROM, optical or magnetic cards, propagation means or other types of machine-readable means suitable to memorize electronic information. For example, the present invention can be downloaded as a computer program that can be transferred from a remote computer (for example a server) to a requesting computer (for example a client), by means of data signals obtained with carrier waves or other propagation means, via a communication connection (for example a modem or a network connection).

According to some embodiments, which can be combined with all the embodiments described here, the apparatus 10 can include a user/operator interface 82. The user/operator interface 82 can be local, or remote. The user/operator interface 82 can be configured to interact with the management and control unit 77. In particular, the user/operator interface 82 can be provided with an input device 83 and a display device 84 associated with the management and control unit 77.

In possible implementations, the input device 83 of the user/operator interface 82 can be an alphanumeric keypad, a pushbutton panel, keys or pressure buttons, touch keys or buttons, physical or virtual keys/buttons.

In possible implementations, the display device 84 of the user/operator interface 82 can be a digital display, a liquid crystal display, a touchscreen display. In the latter case, the touchscreen display can integrate the functions of both the insertion device 83 and the display device 84.

According to some embodiments, which can be combined with all of the embodiments described here, the apparatus 10 can include a communication module 85 (see, for example, FIG. 1). The communication module 85 can be used for communication with the user/operator interface 82. The communication module 85 can be part of the management and control unit 77, or be external to it.

In possible implementations, the communication module 85 can be a cable communication module or a wireless communication module.

For example, in the case of a cable communication module 85, a communication module can be provided that implements a serial connection, such as RS232, or LAN (Local Area Network).

For example, in the case of a wireless communication module 85, a module for short, medium or long-range radio communication can be provided, for example by means of a Wi-Fi protocol. Other possible examples can be with a Bluetooth®, or Zigbee, or Near Field Communication (NFC) protocol, or infrared communication protocol (for example Infrared Data Association, or IrDA).

With reference to FIGS. 8-14 we will now describe possible functioning modes of the apparatus 10 according to the present description.

In particular, FIGS. 8-14 are used to describe the functioning of a single supply unit 11 of the apparatus 10, meaning that a similar or identical description can also be applied to other supply units 11 and to the functioning of the apparatus 10, for example when multiple supply units 11 are involved, each responsible for supplying a specific quantity of the type or variety of coffee beans contained therein and therefore for supplying its own contribution to the final quantity required to make the selected personalized blend.

In the condition shown in FIGS. 8 to 14, the containing device 13 is filled with coffee beans and coffee beans are present up to a certain level in the compartment 22.

As shown in FIG. 8, the first volumetric feed device 14 is positioned in a loading condition of the coffee beans. The coffee beans present in the compartment 22 fill the containing element 27 with coffee beans. In particular, the containing element 27 is in its loading position, that is, it is positioned in correspondence with the through aperture 35 with its introduction end 29 facing toward the compartment 22.

From this condition, the containing element 27 is raised, passing through the mass of coffee beans (FIG. 9). In particular, the drive device 34 is driven, which takes the containing element 27 to a position inside the compartment 22 and, with its introduction end 29, to a level above the level to which the compartment 22 is filled with coffee beans. The coffee beans fill the inner volume of the containing element 27.

Subsequently, as shown in FIGS. 10 and 11, the ejector element 28 can be driven vertically, up and down, to effect a desired alternate travel inside the containing element 27. This alternate up and down movement of the ejector element 28, carried out at least once or more than once as needed, promotes the settling of the coffee beans in the containing element 27 by compacting them and making them as uniformly distributed as possible. Thereafter, by means of the drive device 34, a lowering and further lifting of the containing element 27 can be effected, in practice repeating the conditions of FIGS. 8 and 9. Substantially, the containing element 27 is again driven, lowering it in order to immerse it in the coffee beans present in the compartment 22, and subsequently lifting it above the level of the coffee beans contained so that it is filled flush. At the same time, in this calibration step, the ejector element 28 is alternately moved (FIGS. 10 and 11) as described above, performing one or more other settling and homogenization travels by the ejector element 28 as in FIGS. 10 and 11.

This double movement of the containing element 27, combined with the travel of the ejector element 28, promotes the accuracy of the calibration of the volume of coffee beans contained in the containing element 27.

In this way, in fact, with the lifting movement of the containing element 27 and the settling and homogenization of the coffee beans, the volume of the internal chamber delimited by the walls of the containing element 27 and the ejector element 28 is completely and accurately filled.

The containing element 27 in the raised position, with the ejector element 28 in the lowered position as seen in FIG. 12, is ready, with the desired volumetric quantity of coffee beans contained therein, for the expulsion of all or part of the coffee beans by means of an upward travel of the ejector element 28. The volume of coffee beans contained in the containing element 27 can be calculated to obtain, in an estimated manner, for example based on a statistical density of the coffee beans, a desired weight of coffee beans to be metered toward the delivery aperture 44.

Advantageously, the drive travel of the containing element 27 for calibration purposes can be double, that is, always keeping the ejector element 28 stationary in the lowered position, the containing element 27 can be moved alternately twice downward and upward, so as to obtain exactly a desired level of coffee beans.

The containing element 27 at this point is in its raised position (FIG. 12), in its discharge condition or is positioned with the introduction end 29 protruding from the discharge aperture 36.

It is then provided to drive movement member 31 (FIG. 13) to determine the subsequent expulsion of the coffee beans contained in the containing element 27 by the action of the ejector 28. The coffee beans, emerging from the containing element 27, are conveyed by gravity along the conveyor body 64 and collected in the delivery aperture 44.

The containing element 27 is then shown inside the compartment 22 with the actuation device 34 (FIG. 14).

The second singularized feed device 15 is driven to remove and deliver on each occasion a singularized coffee bean from the compartment 22 to the collection container 12 and therefore make a precise metering of the predefined type or variety of coffee beans, as described above.

It is clear that modifications and/or additions of parts can be made to the apparatus 10 and method for obtaining a coffee blend as described heretofore, without departing from the field and scope of the present invention.

It is also clear that, although the present invention has been described with reference to some specific examples, a person of skill in the art shall certainly be able to achieve many other equivalent forms of apparatus and method for obtaining a coffee blend, having the characteristics as set forth in the claims and hence all coming within the field of protection defined thereby.

The invention claimed is:

1. A supply unit configured to supply a specific type of coffee beans, said supply unit comprising at least one containing device in which the coffee beans of the specific type of coffee are contained, a first volumetric feed device configured to feed a volumetrically metered quantity of coffee beans of a specific type of coffee beans from said containing device, and a second singularized feed device configured to remove coffee beans, one at a time, in a singularized manner, from said containing device,
    wherein said containing device comprises a containing compartment of said type of coffee beans, and
    wherein said second singularized feed device is installed in said compartment.

2. The supply unit of claim 1, wherein said first volumetric feed device is distinct and separate from said second singularized feed device.

3. The supply unit of claim 1, wherein said containing device is provided with a delivery aperture, and wherein said second singularized feed device comprises at least a gripping and delivery element mobile between a position inside said compartment in order to remove a coffee bean, and a position to deliver the coffee bean through said delivery aperture.

4. The supply unit of claim 1, wherein said first volumetric feed device comprises at least a containing element, mobile in said compartment to allow the containing element to fill with coffee beans, and an ejector element associated with said containing element and configured to discharge the coffee beans contained in said containing element.

5. The supply unit of claim 1, wherein a detection device is associated with said second singularized feed device, configured to detect the delivery of each coffee bean.

6. A supply unit configured to supply a specific type of coffee beans, said supply unit comprising at least one containing device in which the coffee beans of the specific type of coffee are contained, a first volumetric feed device configured to feed a volumetrically metered quantity of coffee beans of a specific type of coffee beans from said containing device, and a second singularized feed device configured to remove coffee beans, one at a time, in a singularized manner, from said containing device,
    wherein said containing device is provided with at least a through aperture made in a bottom wall of said containing device and at least a discharge aperture made aligned vertically with the through aperture in an upper wall of said containing device.

7. The supply unit of claim 6, wherein a closing element associated with said through aperture, is provided to selectively close/open said through aperture.

8. The supply unit of claim 6, wherein said first volumetric feed device comprises at least a containing element, mobile in said compartment to allow the containing element to fill with coffee beans, and an ejector element associated with said containing element and configured to discharge the coffee beans contained in said containing element.

9. The supply unit of claim 8, wherein said containing element is installed mobile in said through aperture, and actuation devices associated with said containing element are configured to move said containing element into a loading position in which the containing element is disposed inside the compartment to receive the coffee beans, and in a discharge position in which the containing element is positioned protruding from the discharge aperture in order to discharge the coffee beans.

10. An apparatus for obtaining personalized coffee blends, said apparatus comprising a plurality of supply units, each of said supply units being configured to supply a specific type of coffee beans to a collection container, said supply units comprising at least one containing device in which the coffee beans of the specific type of coffee are contained, a first volumetric feed device configured to feed a volumetrically metered quantity of coffee beans of a specific type of coffee beans from said containing device, and a second singularized feed device configured to remove coffee beans, one at a time, in a singularized manner, from said containing device, said first volumetric feed device being configured to feed a volumetrically metered quantity of coffee beans of the specific type of coffee beans from the respective containing device to said collection container, and said second singularized feed devices being configured to feed coffee beans, one at a time, in a singularized manner, from the respective containing device to said collection container, a weighing unit being associated with said collection container to weigh the coffee beans present in said collection container.

11. The apparatus of claim 10, wherein the at least one containing device of said supply units is installed, in a selectively removable manner, on a common support plate by means of respective positioning bodies.

12. The apparatus of claim 11, wherein between said positioning body and said containing device a rapid coupling member is provided, to attach said containing device to said positioning body.

13. The apparatus of claim 11, wherein said containing device is provided with at least a through aperture, made in a bottom wall of said containing device, and wherein a closing element is associated with said through aperture and is provided to selectively close/open said through aperture, a rapid coupling member is associated with said closing element and with said positioning body and is configured to define the attachment of said containing device to said positioning body when said closing element is in a condition of opening said through apertures, and to allow the release of said containing device from said positioning body when said closing element is in the condition of closing said through apertures.

14. The apparatus of claim 11, wherein said containing device of said supply units is installed on said support plate according to a pattern on the perimeter of a circumference.

15. The apparatus of claim 14, wherein rotation members are associated with said support plate and are configured to make said support plate rotate around an axis of rotation passing through the center of said circumference according to which said supply units are disposed.

16. The apparatus of claim 10, wherein downstream of said collection container a grinding device is provided, configured to grind the coffee beans discharged from said collection container.

17. The apparatus of claim 10, further comprising a protection casing configured to contain at least said supply units and said collection body therein, and wherein said protection casing is configured to generate a closed space with controlled conditions for said coffee beans.

18. The supply unit of claim 10, wherein said first volumetric feed device comprises at least a containing element, mobile in said compartment to allow the containing element to fill with coffee beans, and an ejector element associated with said containing element and configured to discharge the coffee beans contained in said containing element.

19. The apparatus of claim 18, wherein the containing elements of said supply units are installed on a common support body, and wherein said actuation device, common for all the first volumetric feed devices, is configured to move said support body alternately to their loading position and the discharge position.

20. A method for obtaining personalized blends of coffee, said method providing to make available a plurality of types of coffee beans in respective containing devices of supply units, wherein said method comprises:
  feeding, in a first volumetric metering step, a first volumetrically metered quantity of coffee beans from one or more of said containing devices to a collection container with a respective first volumetric feed device of the one or more supply units involved,
  subsequently feeding, in a second singularized metering step, coffee beans one at a time, in a singularized manner, from the one or more containing devices used in the first volumetric metering step, to said collection container using a respective second singularized feed device of the one or more supply units involved, and
  weighing the coffee beans contained in said collection container.

21. An apparatus for obtaining personalized coffee blends, said apparatus comprising:
  a plurality of supply units, each of said supply units configured to supply a specific type of coffee beans to a collection container, each of said supply units comprising:
    at least one containing device in which the coffee beans of the specific type of coffee are contained;
    a first volumetric feed device configured to feed a volumetrically metered quantity of coffee beans of a specific type of coffee beans from said containing device; and
    a second singularized feed device configured to remove coffee beans, one at a time, in a singularized manner, from said containing device,
  wherein the containing device is provided with a through aperture made in a bottom wall of the containing device and a discharge aperture in an upper wall of the containing device and aligned vertically with the through aperture,
  wherein the containing devices of said supply units are installed, in a selectively removable manner, on a common support plate by means of respective positioning bodies, and
  wherein a closing element is associated with said through aperture and provided to selectively close/open said through aperture, a rapid coupling member is associated with said closing element and with said positioning body and is configured to define the attachment of said containing device to said positioning body when said closing element is in a condition of opening said through apertures, and to allow the release of said containing device from said positioning body when said closing element is in the condition of closing said through apertures.

* * * * *